(12) United States Patent
Tao et al.

(10) Patent No.: US 11,682,911 B2
(45) Date of Patent: Jun. 20, 2023

(54) POWER TOOL

(71) Applicant: Globe (Jiangsu) Co., Ltd, Jiangsu (CN)

(72) Inventors: Wen Tao, Jiangsu (CN); Biao Li, Jiangsu (CN)

(73) Assignee: Globe (Jiangsu) Co., Ltd, Changzhou (CN)

( * ) Notice: Subject to any disclaimer, the term of this patent is extended or adjusted under 35 U.S.C. 154(b) by 302 days.

(21) Appl. No.: 17/099,526

(22) Filed: Nov. 16, 2020

(65) Prior Publication Data
US 2021/0151993 A1 May 20, 2021

(30) Foreign Application Priority Data
Nov. 19, 2019 (CN) .......................... 201911132514.1

(51) Int. Cl.
*H02J 7/00* (2006.01)
*A01D 34/78* (2006.01)
*B25F 5/02* (2006.01)

(52) U.S. Cl.
CPC ............ *H02J 7/0013* (2013.01); *A01D 34/78* (2013.01); *B25F 5/02* (2013.01); *H02J 7/0047* (2013.01)

(58) Field of Classification Search
CPC ...... H02J 7/0013; H02J 7/0047; A01D 34/78; B25F 5/02
See application file for complete search history.

(56) References Cited

U.S. PATENT DOCUMENTS

| | | | | |
|---|---|---|---|---|
| 4,223,262 A | * | 9/1980 | Ballman | H02J 7/0049 320/DIG. 12 |
| 4,571,531 A | * | 2/1986 | Lin | H02J 7/007 182/362/183 |
| 5,028,858 A | * | 7/1991 | Schnizler | B23B 45/02 320/136 |

(Continued)

FOREIGN PATENT DOCUMENTS

| | | | | |
|---|---|---|---|---|
| CN | 106992567 A | * | 7/2017 | ............ H02J 7/0045 |
| CN | 109494838 A | * | 3/2019 | .......... H02J 7/00032 |

(Continued)

OTHER PUBLICATIONS

Extended Search Report of Counterpart European Patent Application No. 20208657.5 dated Mar. 19, 2021.

*Primary Examiner* — Nathaniel C Chukwurah
*Assistant Examiner* — Lucas E. A. Palmer

(57) ABSTRACT

The invention provides a power tool, which comprises a motor, at least two battery packs supplying power to the motor and arranged in parallel. The power tool also comprises a relay control circuit used for connecting the motor and the battery packs, and the relay control circuit is provided with a controller, and a plurality of relay switch circuits connected with the controller. The controller is used for detecting the electric energy and/or an user state of battery packs and generates battery pack selection signals, the relay switch circuits and the battery packs are arranged one-to-one, the relay switch circuits receive the battery pack selection signals and control turning on/turning off of relays switches therein, and further switch the battery packs in the on state, to make only one battery pack in the on state at the same time.

7 Claims, 2 Drawing Sheets

(56) References Cited

U.S. PATENT DOCUMENTS

| | | | | |
|---|---|---|---|---|
| 5,422,558 A * | 6/1995 | Stewart | H02J 7/0013 320/120 |
| 5,867,007 A * | 2/1999 | Kim | H02J 7/0024 320/118 |
| 8,253,378 B2 * | 8/2012 | Lee | H02J 7/0047 320/118 |
| 8,547,066 B2 * | 10/2013 | Bieler | H02J 7/0013 320/112 |
| 8,803,483 B2 * | 8/2014 | Nagase | H02J 7/0031 320/135 |
| 8,907,597 B2 * | 12/2014 | Kim | B60L 58/18 320/124 |
| 11,063,543 B2 | 7/2021 | Nakamoto | H02P 9/48 |
| 2006/0126249 A1 * | 6/2006 | Boling | H02J 7/0031 361/103 |
| 2009/0128165 A1 * | 5/2009 | Nie | G01R 27/2605 324/658 |
| 2010/0102882 A1 * | 4/2010 | Yoshino | B41J 2/14274 330/251 |
| 2012/0013304 A1 * | 1/2012 | Murase | B60L 58/21 320/116 |
| 2012/0182021 A1 * | 7/2012 | McCoy | G01R 31/3832 324/433 |
| 2012/0268057 A1 * | 10/2012 | Wu | H01M 10/44 320/103 |
| 2012/0319652 A1 * | 12/2012 | Namou | H02J 7/0025 320/116 |
| 2014/0062413 A1 * | 3/2014 | Kim | H02J 7/0014 320/128 |
| 2014/0265604 A1 * | 9/2014 | Mergener | H02J 7/34 307/80 |
| 2015/0333666 A1 * | 11/2015 | Miller | B25F 5/00 318/139 |
| 2018/0152043 A1 * | 5/2018 | Geng | H01M 50/202 |
| 2019/0160972 A1 * | 5/2019 | Zeiler | H02J 7/0063 |
| 2019/0386497 A1 * | 12/2019 | Degelau | H01M 50/502 |
| 2020/0153265 A1 * | 5/2020 | Johnson | H02J 7/00 |

FOREIGN PATENT DOCUMENTS

| | | | | |
|---|---|---|---|---|
| CN | 109494838 A | | 3/2019 | |
| CN | 112104036 A | * | 12/2020 | ............ B60L 53/12 |
| EP | 3288147 A1 | | 2/2018 | |
| JP | 08251714 A | * | 9/1996 | |
| JP | 08251714 A | | 9/1996 | |
| WO | 2018031719 A1 | | 2/2018 | |

* cited by examiner

POWER TOOL

CROSS-REFERENCE TO RELATED INVENTIONS

This invention is a US invention which claims the priority of CN invention Serial No. CN201911132514.1, filed on Nov. 19, 2019, the disclosures of which are hereby incorporated by reference in their entirety.

TECHNICAL FIELD

The invention relates to a power tool, and belongs to the technical field of garden power tools.

BACKGROUND ART

At present, the garden power tools develop towards the direction of high voltage, high power and long-time endurance.

To achieve this aim, the design of arranging multiple battery packs on a garden power tool is becoming common knowledge. The garden power tool is provided with the battery packs connected in series or in parallel to meet the requirements of the garden power tool on high voltage, high power and long-time endurance. However, since the voltage of the battery packs is higher than a safe voltage, there is a risk of leakage of the battery pack, which may cause injury to the operator. Meanwhile, due to the adoption of the design of multiple battery packs, terminals of the battery packs are electrically connected and conducted, the terminals may be possibly exposed in the process of using or replacing the battery packs, and the operator may touch the terminals by mistake and get an electric shock. In addition, in the case of parallel battery packs, the battery packs may be charged with each other due to the electrical connection between the battery packs through the terminals.

In view of the above, there is a need to provide a new power tool to solve the above problems

SUMMARY OF INVENTION

The object of the present invention is to provide a power tool, which can conveniently and quickly complete the switching among a plurality of parallel battery packs by arranging a relay control circuit, thereby ensuring the endurance of the power tool; meanwhile, avoiding mutual charging between the battery packs due to voltage difference between the battery packs.

In order to achieve above purpose, a power tool, comprising a motor; at least two battery packs supplying electrical energy to the motor and arranged in parallel; a relay control circuit connecting the motor and the battery packs, the relay control circuit provided with a controller, and a plurality of relay switch circuits connected with the controller, wherein the controller is used for detecting the electric energy and/or an user state of battery packs and generates battery pack selection signals, the relay switch circuits and the battery packs are arranged one-to-one, the relay switch circuits receive the battery pack selection signals and control turning on/turning off of relays switches therein, and further switch the battery packs in the on state, to make only one battery pack in the on state at the same time.

As a further improvement of the present invention, the relay switch circuits comprise a battery pack selecting signal receiver in signal connection with the controller and a control signal transmitter, the relay switch is connected between the battery pack selecting signal receiver and the control signal transmitter, and the relay switch can turning on/turning off under the cooperation of the battery pack selecting signal received by the battery pack selecting signal receiver and a control signal transmitted by the control signal transmitter.

As a further improvement of the present invention, the battery packs have a first battery pack and a second battery pack, the relay switch circuits have a first relay switch circuit for controlling the first battery pack to be switched on/off and a second relay switch circuit for controlling the second battery pack to be switched on/off, and the battery pack selection signals have a first battery pack selection signal for controlling the first relay switch circuit, and a second battery pack selection signal for controlling the second relay switch circuit.

As a further improvement of the present invention, the first relay switch circuit comprises a first relay switch, when a voltage of the first battery pack is higher than a predetermined value or only the first battery pack is connected in the relay control circuit, the controller sends a first battery pack selection signal to control the closing of the first relay switch in the first relay switch circuit, the first battery pack is in a conducting state, and at the moment, the second relay switch in the second relay switch circuit is in a disconnected state.

As a further improvement of the present invention, the first relay switch circuit also comprises a first diode; a first transistor and a second transistor which are both connected between the first battery pack selection signal receiver and the first relay switch; and a third transistor connected between the first control signal transmitter and the first relay switch.

As a further improvement of the present invention, the second relay switch circuit comprises a second relay switch, when the voltage of the first battery pack is lower than the predetermined value or only the second battery pack is connected in the relay control circuit, the controller sends a second battery pack selecting signal to control the second relay switch in the second relay switch circuit to turn on, the second battery pack is in a conducting state, and at the moment, the first relay switch in the first relay switch circuit is in a disconnected state.

As a further improvement of the present invention, the second relay switch circuit further comprises a second diode connected with the second relay switch in parallel; and a fourth transistor, a fifth transistor and a sixth transistor which are all connected between a second battery pack selection signal receiver and the second relay switch; and a seventh transistor connected between the second control signal transmitter and the second relay switch.

As a further improvement of the present invention, the first battery pack selection signal is a high-level battery pack selection signal, and the second battery pack selection signal is a low-level battery pack selection signal.

As a further improvement of the present invention, the power tool also comprises a housing for accommodating the motor and the battery packs, a moving component used for driving the power tool to move and a working component drivingly connected with the motor.

As a further improvement of the present invention, the working assembly is a mowing assembly.

The beneficial effects of the present invention are: the power tool can conveniently and rapidly complete the switching of the battery packs by setting the relay control circuit connecting the motor and the battery packs, and that ensures the endurance of the power tool. Meanwhile, by disposing the controller and the relay switch circuits which are connected to the controller and arranged in one-to-one correspondence to the battery packs in the relay control circuit, only one battery pack can be in a on state at the same moment, and by such arrangement, on one hand, electric shock caused by mistakenly touching the connecting terminals can be prevented when replacing the abnormal/low-power battery pack; on the other hand, the occurrence of mutual charging between the battery packs is avoided when a voltage difference exists between the parallel battery packs, and the practicability and the cruising ability of the power tool are further improved.

DESCRIPTION OF EMBODIMENT

Figure 1:
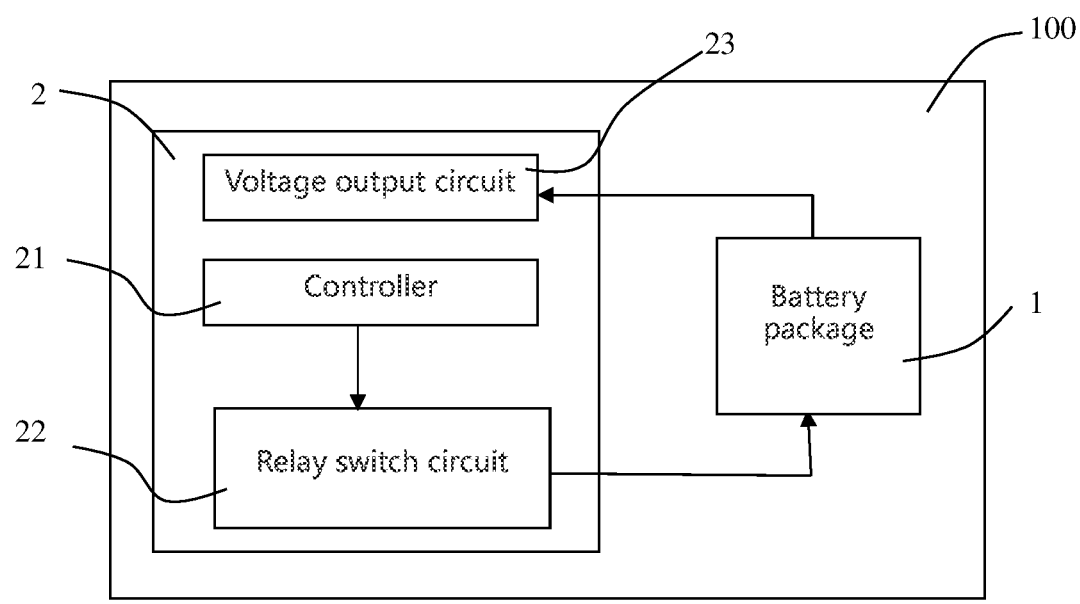
FIG. 1 is a block diagram of a power tool according to an embodiment of present invention.

In order to make the objects, technical solutions and advantages of the present invention more apparent, the present invention will be described in detail with reference to the accompanying drawings and specific embodiments.

It should be noted that, in order to avoid obscuring the present invention with unnecessary details, only the structures and/or processing steps closely related to the aspects of the present invention are shown in the drawings, and other details not closely related to the present invention are omitted.

In addition, it is also to be noted that the terms "comprises," "include," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Referring to FIG. 1, the invention provides a power tool 100, which has a motor (not shown) and a plurality of battery packs 1 electrically connected to the motor. The motor is used for driving a working assembly connected to the motor to complete corresponding working tasks. The battery packs 1 are used for supplying power to the motor.

In the invention, at least two battery packs 1 are provided, and the battery packs 1 are connected in parallel, furthermore, the motor and the battery packs 1 are connected by a relay control circuit 2, and the relay control circuit 2 can be used to switch the battery packs 1 so that only one battery packs 1 is in the on state.

The relay control circuit 2 is provided with a controller 21, a relay switch circuits 22 connected with the controller 21, and a voltage output circuit 23 for connecting the relay switch circuits 22 and the motor.

The controller 21 is used for detecting the electric energy and/or the use state of the battery packs 1 and generates battery pack selection signals so as to control the on-off of the relay control circuit 2. In the invention, the relay switch circuit 22 is provided in one-to-one correspondence with the battery packs 1 to control the battery packs 1 connected to the relay switch circuit 22.

In the embodiment of the present invention, the relay switch circuit 22 has a battery pack selection signal receiver 221 in signal connection with the controller 21, a control signal transmitter 222, and a relay switch 223 connected between the battery pack selection signal receiver 221 and the control signal transmitter 222, and the control relay switch 223 can turn on under the cooperation of the battery pack selection signal received by the battery pack selection signal receiver 221 and the control signal transmitted by the control signal transmitter 222, so that the relay control circuit 2 is turned on.

Figure 2:
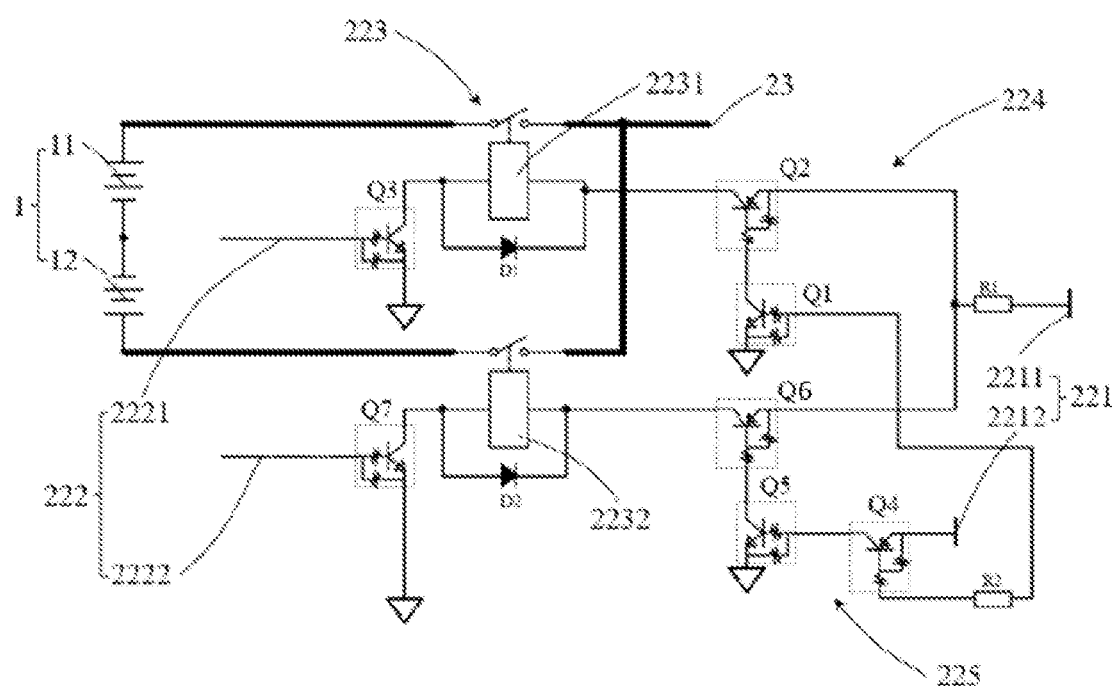
FIG. 2 is a circuit diagram of a relay control circuit of the power tool according to an embodiment of present invention.

FIG. 2 is a schematic circuit diagram of the relay control circuit 2 of the power tool 100 the according to a preferred embodiment of the invention. Referring to FIGS. 1 and 2, in the present embodiment, the battery pack 1 has a first battery pack 11 and a second battery pack 12 that are arranged in parallel, and the controller 21 has a dual-signal relay control function, and can simultaneously detect the electric energy and/or use state of the first battery pack 11 and the second battery pack 12 and send a first battery pack selection signal and a second battery pack selection signal for controlling on/off of the relay switch circuit 22. Preferably, the first battery pack selection signal is a high-level battery pack selection signal, and the second battery pack selection signal is a low-level battery pack selection signal.

The relay switch circuits 22 includes a first relay switch circuit 224 for receiving the first battery pack selection signal and controlling the first battery pack 11 to be turned on/off, and a second relay switch circuit 225 for receiving the second battery pack selection signal and controlling the second battery pack 12 to be turned on/off.

Furthermore, the first relay switch circuit 224 has a first relay switch 2231 for controlling on/off of the first relay switch circuit 224, a first battery pack selection signal receiver 2211 in signal connection with the controller 21, and a first control signal transmitter 2221, and the first relay switch circuit 224 further includes a first transistor Q1 and a second transistor Q2 both connected between the first battery pack selection signal receiver 2211 and the first relay switch 2231; and a third transistor Q3 connected between the first control signal transmitter 2221 and the first relay switch 2231.

The second relay switch circuit 225 includes a second relay switch 2232 for controlling on/off of the second relay switch circuit 225, a second battery pack selection signal receiver 2212 in signal connection with the controller 21, and a second control signal transmitter 2222. Furthermore, the second relay switch circuit 225 further has a fourth transistor Q4, a fifth transistor Q5 and a sixth transistor Q6 all connected between the second battery pack selection signal receiver 2212 and the second relay switch 2232; and a seventh transistor Q7 connected between the second control signal transmitter 2222 and the second relay switch 225.

Preferably, the first relay switch circuit 224 in this embodiment further has a first diode D1 disposed in parallel with the first relay switch 2231, and the second relay switch circuit 225 further includes a second diode D2 disposed in parallel with the second relay switch 2232, so as to effectively prevent the first relay switch 2231 and the second relay switch 1141 from simultaneously operating.

Figure 3:
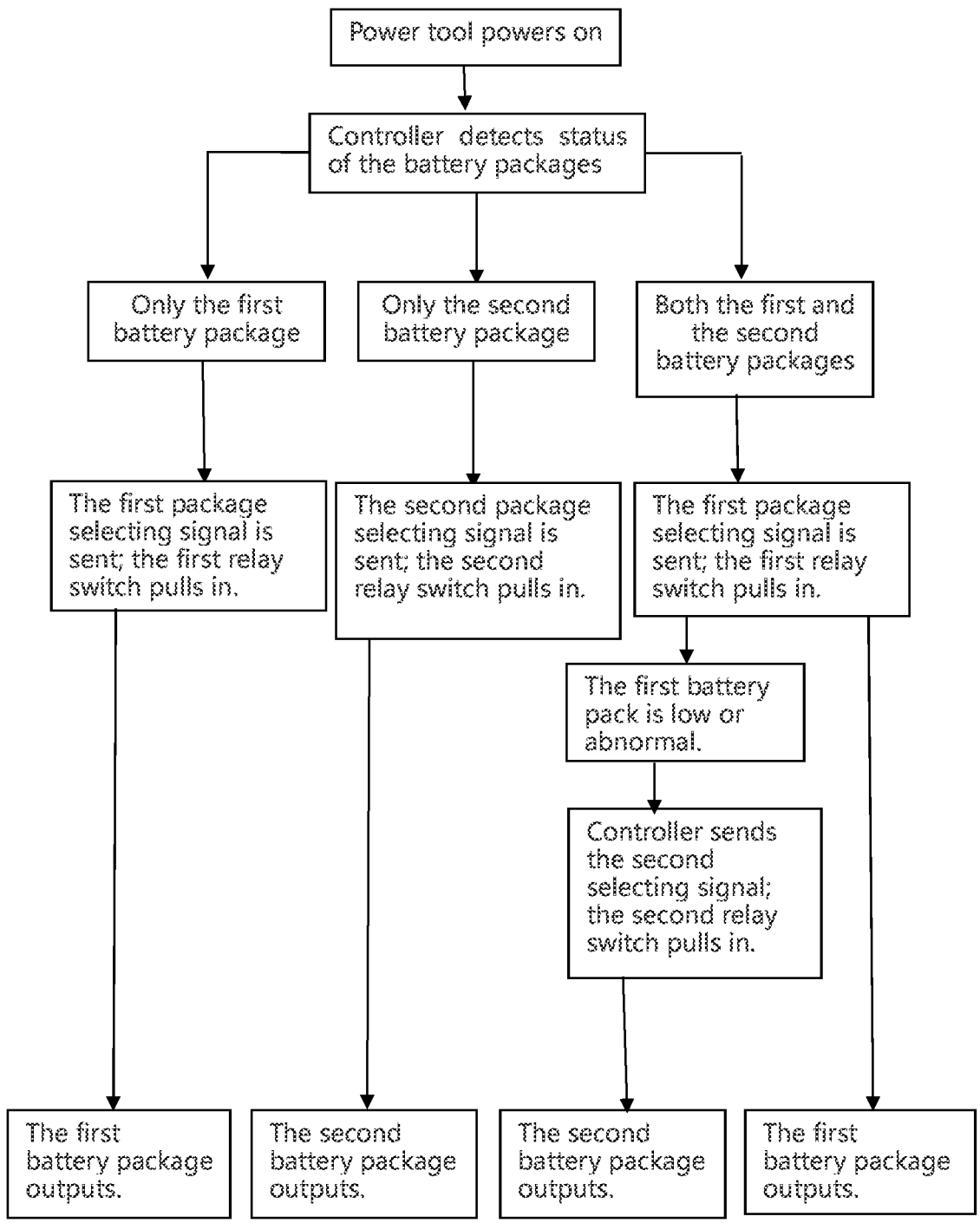
FIG. 3 is a flow chart of the relay control circuit in FIG. 2.

Referring to FIG. 3 in combination with FIG. 2, when the electric power tool 100 of the present embodiment is used for gardening work, firstly, a main switch of the electric power tool 100 is turned on to power on the electric power tool 100, and at this time, the controller 21 starts to detect the electrical energy and/or use status of the battery packs 1. Specifically, when the controller 21 detects that only the first battery pack 11 is connected to the relay control circuit 2 in the electric power tool 100, the controller 21 sends a first battery pack selection signal, the first battery pack selection signal receiver 2211 receives the first battery pack selection signal and conducts both of the first transistor Q1 and the second transistor Q2 of the first relay switch circuit 224; and meanwhile, the first control signal transmitter 2221 sends a control signal to the first relay switch 2231, the third diode Q3 is turned on, there is a voltage across the first relay switch 2231, the first relay switch 2231 turns on, and the voltage output circuit 23 has a voltage output, the power tool 100 supplies power to the motor through the first battery pack 11. At this time, since the second relay switch 2232 in the second relay switch circuit 225 is turn off, the second relay switch circuit 225 is not electrified, so as to prevent the occurrence of electric shock.

When the controller 21 detects that only the second battery pack 12 is connected to the relay control circuit 2, the controller 21 sends a second battery pack selection signal, the second battery pack selection signal receiver 2212 receives the second battery pack selection signal and conducts the fourth transistor Q4, the fifth transistor Q5 and the sixth transistor Q6 in the second relay switch circuit 225; meanwhile, the second control signal transmitter 2222 sends a control signal to the second relay switch 2232, and the seventh diode Q7 is turned on, there is a voltage across the second relay switch 2232, the second relay switch 2232 turns on, the voltage output circuit 23 has voltage output, and the power tool 100 provides electric power for the motor through the second battery pack 12. At this time, since the first relay switch 2231 in the first relay switch circuit 224 is turn off, the first relay switch circuit 224 is not electrified, which can also prevent the occurrence of electric shock.

Furthermore, when the relay control circuit 2 is connected to both of the first battery pack 11 and the second battery pack 12 at the same time, the controller 21 firstly starts to detect the electrical energy and/or use state of the first battery pack 11, if the voltage of the first battery pack 11 is normal, the controller 21 sends a first battery pack selection signal to conduct of the first transistor Q1, the second transistor Q2 and the third diode Q3, the first relay switch 2231 turns on, the first relay switch circuit 224 is in the on state, and the power tool 100 provides voltage for the motor connected to the voltage output circuit 23 through the first battery pack 11. At this time the second relay switch 2232 is turn off, and the second relay switch circuit 225 is in off state.

If the controller 21 detects that the electric energy of the first battery pack 11 is lower than a predetermined value, the controller 21 gives an error notification and sends a second battery pack selection signal, the first relay switch 2231 is turn off, the first relay switch circuit 224 is in an off state, while the fourth transistor Q4, the fifth transistor Q5, the sixth transistor Q6 and the seventh diode Q7 in the second relay switch 225 are conducted under the control of the second battery pack selection signal, the second relay switch 2232 turns on, and the second battery pack 12 provides electric power for the motor through the voltage output circuit 23. At this time, since the first relay switch circuit 224 is in an off state, the second battery pack 12 cannot charge the first battery pack 11 through the first relay switch circuit 224, so that mutual charging caused by the voltage difference between the first battery pack 11 and the second battery pack 12 is avoided, that can effectively prevent the consumption of the electric energy of the battery packs 1 due to the mutual charging between the battery packs 1, and further ensure a cruising ability of the power tool 100.

If the controller 21 detects that the first battery pack 11 is abnormal, the controller 21 gives an error notification and sends a second battery pack selection signal to control the first battery pack 11 to stop discharging and the second battery pack 12 to start discharging, so as to ensure normal use of the power tool 100. Meanwhile, in the process, the first relay switch circuit 224 is in an off state, so that electric shock and the like cannot occur even the first battery pack 11 needs to be disassembled for charging and/or maintenance, and the safety of the power tool 100 is effectively improved.

Further, when the electric energy of the second battery pack 12 is lower than a predetermined value, the controller 21 re-executes the task of detecting the first battery pack 11, and at this time, if the electric energy of the first battery pack 11 is restored to be higher than the predetermined value after being charged or the abnormality of the first battery pack 11 is removed, the controller 21 sends the first battery pack selection signal, the second relay switch 2232 is turn off, the first relay switch 2231 is turn on, and the power tool 100 supplies power to the motor through the first battery pack 11. If the electric energy of the first battery pack 11 is still below the predetermined value or the abnormality of the first battery pack 11 is not resolved, the controller 21 stops sending the battery pack selection signal, and the power tool 100 is powered off.

It should be noted that the predetermined value detected by the controller 21 is a power-down threshold value capable of controlling the first battery pack 11 or the second battery pack 12 to be normally powered down, that is, when the controller 21 detects that the electric energy of the first battery pack 11 is lower than the power-down threshold value, the controller 21 sends a second battery pack selection signal to control the first battery pack 11 to stop discharging, and the second battery pack 12 starts discharging, so as to ensure the continuous use of the power tool 100; and the same applies when the controller 21 detects that the electric energy of the second battery pack 12 is below the power-down threshold.

In the present invention, the power tool 100 further has a housing for accommodating the motor and the battery packs 1, a moving component connected to the housing for driving the power tool 100 to move, and a working component drivingly connected to the motor. Furthermore, in a preferred embodiment of the present invention, the working assembly is a mowing assembly for performing a mowing task, so that the electric power tool 100 in the present embodiment can perform a corresponding mowing task.

Of course, in other embodiments of the present invention, the working assembly may also be other garden working assembly for performing corresponding garden working tasks or other working assembly for performing other working tasks, that is, the working assembly to which the power tool 100 of the present invention is connected may be selected according to actual needs, and is not limited herein.

In summary, in virtue of the relay control circuit 2 connecting the motor and the battery packs 1, the power tool 100 can conveniently and rapidly complete the switching of the battery packs 1 and ensures the endurance of the power tool 100. Meanwhile, by disposing the controller 21 and the relay switch circuits 22 which are connected to the controller 21 and arranged in one-to-one correspondence to the battery packs 1 in the relay control circuit 2, only one battery pack 1 can be in a on state at the same moment, and by such arrangement, on one hand, electric shock caused by mistakenly touching the connecting terminals can be prevented when replacing the abnormal/low-power battery pack 1; on the other hand, the occurrence of mutual charging between the battery packs 1 is avoided when a voltage difference exists between the parallel battery packs 1, and the practicability and the cruising ability of the power tool 100 are further improved.

The above embodiment is only used to illustrate the technical solution of the present invention and are not limiting. Although the present invention has been described in detail with reference to the preferred embodiment, those skilled in the art should understand that the technical solution of the present invention may be modified or equivalently replaced without departing from the spirit and scope of the technical solution of the present invention.

What is claimed is:

1. A power tool, comprising:
   a motor;
   at least two battery packs supplying electrical energy to the motor and connected in parallel;
   a relay control circuit connecting the motor and the battery packs, the relay control circuit provided with a controller, and a plurality of relay switch circuits connected with the controller;
   wherein the controller is used for detecting the electric energy and/or a user state of battery packs and generates battery pack selection signals, the relay switch circuits are arranged corresponding to the battery packs, the relay switch circuits receive the pack selection signals and control turning on/turning off of relay switches therein, and further switch the battery packs in the on state, to make only one battery pack in the on state at the same time;
   wherein the battery packs have a first battery pack and a second battery pack, the relay switch circuits have a first relay switch circuit for controlling the first battery pack to be switched on/off and a second relay switch circuit for controlling the second battery pack to be switched on/off, and the battery pack selection signals have a first battery pack selection signal for controlling the first relay switch circuit, and a second battery pack selection signal for controlling the second relay switch circuit;
   wherein the first relay switch circuit comprises a first relay switch, when a voltage of the first battery pack is higher than a predetermined value or only the first battery pack is connected in the relay control circuit, the controller sends a first battery pack selection signal to control the closing of the first relay switch in the first relay switch circuit, the first battery pack is in a conducting state, and at the moment, the second relay switch in the second relay switch circuit is in a disconnected state;
   wherein the first relay switch circuit also comprises a first diode; a first transistor and a second transistor which are both connected between a first battery pack selection signal receiver and the first relay switch; and a third transistor connected between a first control signal transmitter and the first relay switch.

2. The power tool according to claim 1, wherein the relay switch circuits comprise a battery pack selecting signal receiver in signal connection with the controller and a control signal transmitter, the relay switch is connected between the battery pack selecting signal receiver and the control signal transmitter, and the relay switch can turning on/turning off under the cooperation of the battery pack selecting signal received by the battery pack selecting signal receiver and a control signal transmitted by the control signal transmitter.

3. The power tool according to claimer 1, wherein the second relay switch circuit comprises a second relay switch, when the voltage of the first battery pack is lower than the predetermined value or only the second battery pack is connected in the relay control circuit, the controller sends a second battery pack selecting signal to control the second relay switch in the second relay switch circuit to turn on, the second battery pack is in a conducting state, and at the moment, the first relay switch in the first relay switch circuit is in a disconnected state.

4. The power tool according to claim 1, wherein the first battery pack selection signal is a high-level pack selection signal, and the second battery pack selection signal is a low-level pack selection signal.

5. The power tool according to claim 1, wherein the power tool further comprises a housing for accommodating the motor and the battery packs, a moving component used for driving the power tool to move and a working component drivingly connected with the motor.

6. The power tool according to claim 5, wherein the working assembly is a mowing assembly.

7. A power tool, comprising:
   a motor;
   at least two battery packs supplying electrical energy to the motor and connected in parallel;
   a relay control circuit connecting the motor and the battery packs, the relay control circuit provided with a controller, and a plurality of relay switch circuits connected with the controller;
   wherein the controller is used for detecting the electric energy and/or a user state of battery packs and generates battery pack selection signals, the relay switch circuits are arranged corresponding to the battery packs, the relay switch circuits receive the pack selection signals and control turning on/turning off of relay switches therein, and further switch the battery packs in the on state, to make only one battery pack in the on state at the same time;
   wherein the battery packs have a first battery pack and a second battery pack, the relay switch circuits have a first relay switch circuit for controlling the first battery pack to be switched on/off and a second relay switch circuit for controlling the second battery pack to be switched on/off, and the battery pack selection signals have a first battery pack selection signal for controlling the first relay switch circuit, and a second battery pack selection signal for controlling the second relay switch circuit;
   wherein the second relay switch circuit comprises a second relay switch, when the voltage of the first battery pack is lower than the predetermined value or only the second battery pack is connected in the relay control circuit, the controller sends a second battery pack selecting signal to control the second relay switch in the second relay switch circuit to turn on, the second battery pack is in a conducting state, and at the moment, the first relay switch in the first relay switch circuit is in a disconnected state;
   wherein the second relay switch circuit further comprises a second diode connected with the second relay switch in parallel; and a fourth transistor, a fifth transistor and a sixth transistor which are all connected between a second battery pack selection signal receiver and the second relay switch; and a seventh transistor connected between a second control signal transmitter and the second relay switch.

* * * * *